(12) United States Patent
Chang

(10) Patent No.: US 10,146,016 B1
(45) Date of Patent: Dec. 4, 2018

(54) MPO MICRO-LATCHLOCK CONNECTOR

(71) Applicant: Senko Advanced Components, Inc., Marlborough, MA (US)

(72) Inventor: Jimmy Jun-Fu Chang, Worcester, MA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 15/613,674

(22) Filed: Jun. 5, 2017

Related U.S. Application Data

(60) Provisional application No. 62/504,154, filed on May 10, 2017.

(51) Int. Cl.
    *G02B 6/38* (2006.01)

(52) U.S. Cl.
    CPC ......... *G02B 6/3885* (2013.01); *G02B 6/3825* (2013.01); *G02B 6/3831* (2013.01); *G02B 6/3849* (2013.01); *G02B 6/3882* (2013.01); *G02B 6/3887* (2013.01)

(58) Field of Classification Search
    CPC .. G02B 6/3825; G02B 6/3831; G02B 6/3849; G02B 6/3882; G02B 6/3885; G02B 6/3887
    USPC ...................................................... 385/53–87
    See application file for complete search history.

(56) References Cited

U.S. PATENT DOCUMENTS

| | | | |
|---|---|---|---|
| 4,312,564 A | 1/1982 | Cefarelli et al. | |
| 4,327,964 A | 5/1982 | Haesly et al. | |
| 4,478,473 A | 10/1984 | Frear | |
| 4,762,388 A | 8/1988 | Tanaka et al. | |
| 4,764,129 A | 8/1988 | Jones et al. | |
| 4,840,451 A | 6/1989 | Sampson et al. | |
| 4,872,736 A | 10/1989 | Myers et al. | |
| 4,979,792 A | 12/1990 | Weber et al. | |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Michael Mooney
(74) *Attorney, Agent, or Firm* — Edward S. Jarmolowicz, Esq.

(57) ABSTRACT

Optical fiber connectors and adapters are disclosed. A connector includes a flat pin assembly including a pin, a mechanical transfer ferrule boot disposed around at least a portion of the assembly, a housing disposed around at least a portion of the ferrule, and a low profile key. The housing includes first, second, top, and bottom sides. The first and second sides include a recess. The top side includes a groove. The low profile key includes a fastening mechanism configured to interlock with the groove. An optical fiber adapter includes first and second adapter ends each having one or more connecting arms. Each adapter end is configured to receive a separate optical fiber connector. The first and second adapter ends are configured to couple the separate optical fiber connectors to each other when received.

16 Claims, 5 Drawing Sheets

(56) References Cited

U.S. PATENT DOCUMENTS

| | | |
|---|---|---|
| 5,041,025 A | 8/1991 | Haitmanek |
| D323,143 S | 1/1992 | Ohkura et al. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,335,301 A | 8/1994 | Newman et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,636,424 B2 | 1/2014 | Kuffel et al. |
| 8,651,749 B2 | 2/2014 | Dainese Junior et al. |
| 8,770,863 B2 | 7/2014 | Cooke et al. |
| 9,188,747 B2 * | 11/2015 | Gniadek .............. G02B 6/3825 |
| 9,411,110 B2 | 8/2016 | Barnette et al. |
| 9,494,744 B2 | 11/2016 | de Jong |
| 9,548,557 B2 | 1/2017 | Liu |
| 9,551,842 B2 | 1/2017 | Theuerkorn |
| 9,568,686 B2 | 2/2017 | Fewkes et al. |
| 9,581,768 B1 | 2/2017 | Baca et al. |
| 9,684,313 B2 | 6/2017 | Cline et al. |
| 2003/0053787 A1 | 3/2003 | Lee |
| 2003/0095754 A1 * | 5/2003 | Matsumoto .......... G02B 6/3885 385/86 |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0290938 A1 | 11/2009 | Lin |
| 2010/0034502 A1 | 2/2010 | Lu et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0322825 A1 | 12/2013 | Cooke et al. |
| 2014/0016901 A1 | 1/2014 | Lambourn et al. |
| 2014/0023322 A1 | 1/2014 | Gniadek et al. |
| 2014/0050446 A1 | 2/2014 | Chang |

(56) References Cited

U.S. PATENT DOCUMENTS

| | | | |
|---|---|---|---|
| 2014/0133808 A1 | 5/2014 | Hill et al. |
| 2014/0219621 A1 | 8/2014 | Barnette et al. |
| 2014/0226946 A1 | 8/2014 | Cooke et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0301294 A1 | 10/2015 | Chang |
| 2015/0355417 A1 | 10/2015 | Takano |
| 2015/0331201 A1 | 11/2015 | Takano et al. |
| 2015/0378113 A1 | 12/2015 | Good et al. |
| 2016/0172852 A1 | 6/2016 | Takano |
| 2016/0291262 A1 | 6/2016 | Chang |
| 2016/0195682 A1 | 7/2016 | Takano |
| 2016/0266326 A1 | 9/2016 | Gniadek |
| 2016/0320572 A1 | 11/2016 | Gniadek |
| 2016/0131849 A1 | 12/2016 | Takano |
| 2017/0003458 A1 | 1/2017 | Gniadek |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Feb. 19, 2015 for EP 14168005.

"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6IDVc WYbr0QQ.

"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/Katalog¬Glenair¬LWL-1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Aug. 29, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

International Preliminary Report on Patentability dated Sep. 14, 2017 from related International Application No. PCT/US2015/059458, International Filing Date Nov. 6, 2015.

International Search Report (ISR) WO2008112986 dated Sep. 15, 2009.

ISR WO2012162385ISR Nov. 29, 2012.
ISR WO2014028527ISR Jul. 16, 2015.
ISR WO2015191024ISR Oct. 9, 2014.
ISR WO2015US57610ISR Sep. 22, 2016.
ISR WO2016176083ISR May 19, 2016.
ISR WO2016148741ISR Sep. 22, 2016.

\* cited by examiner

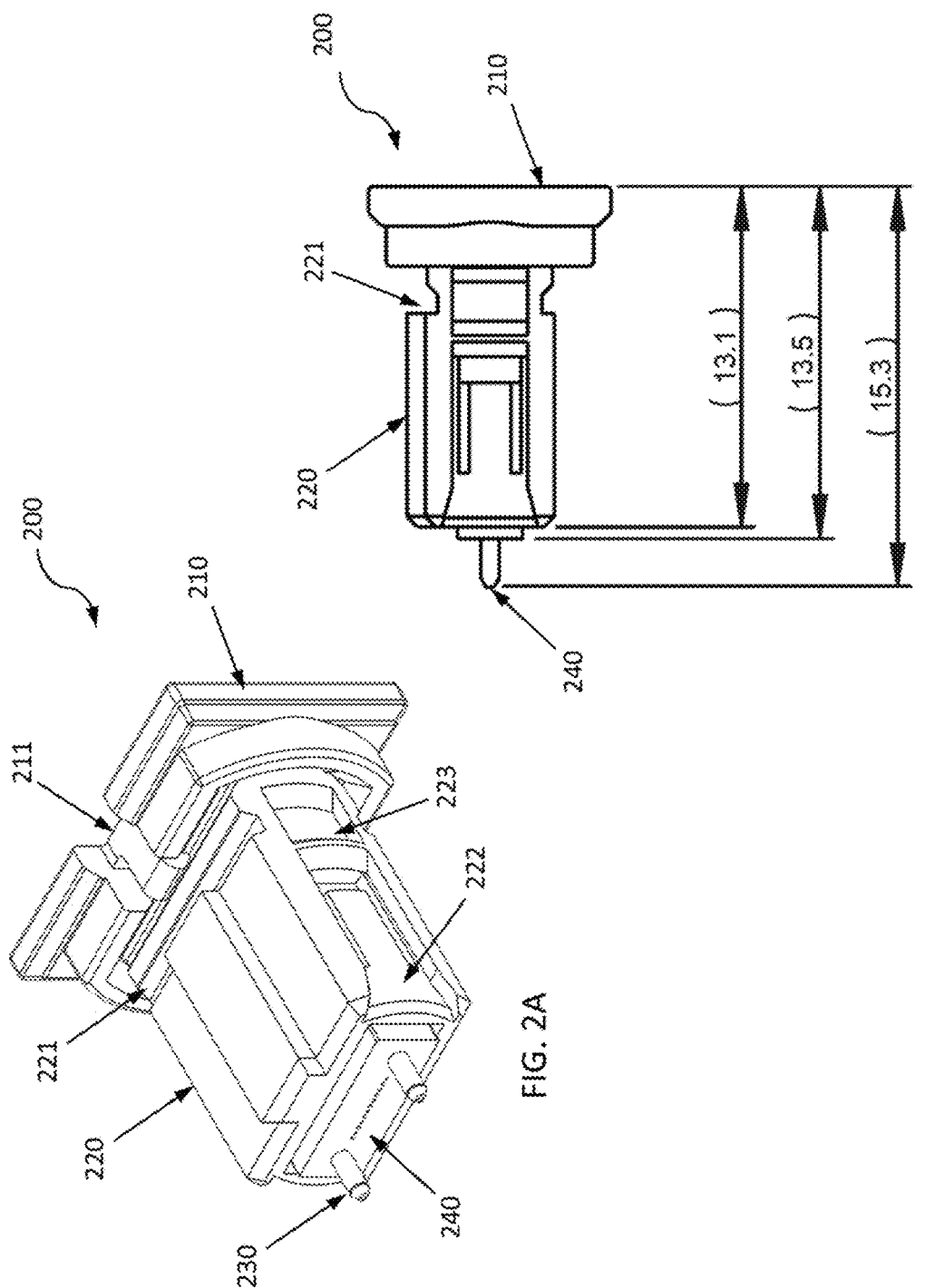

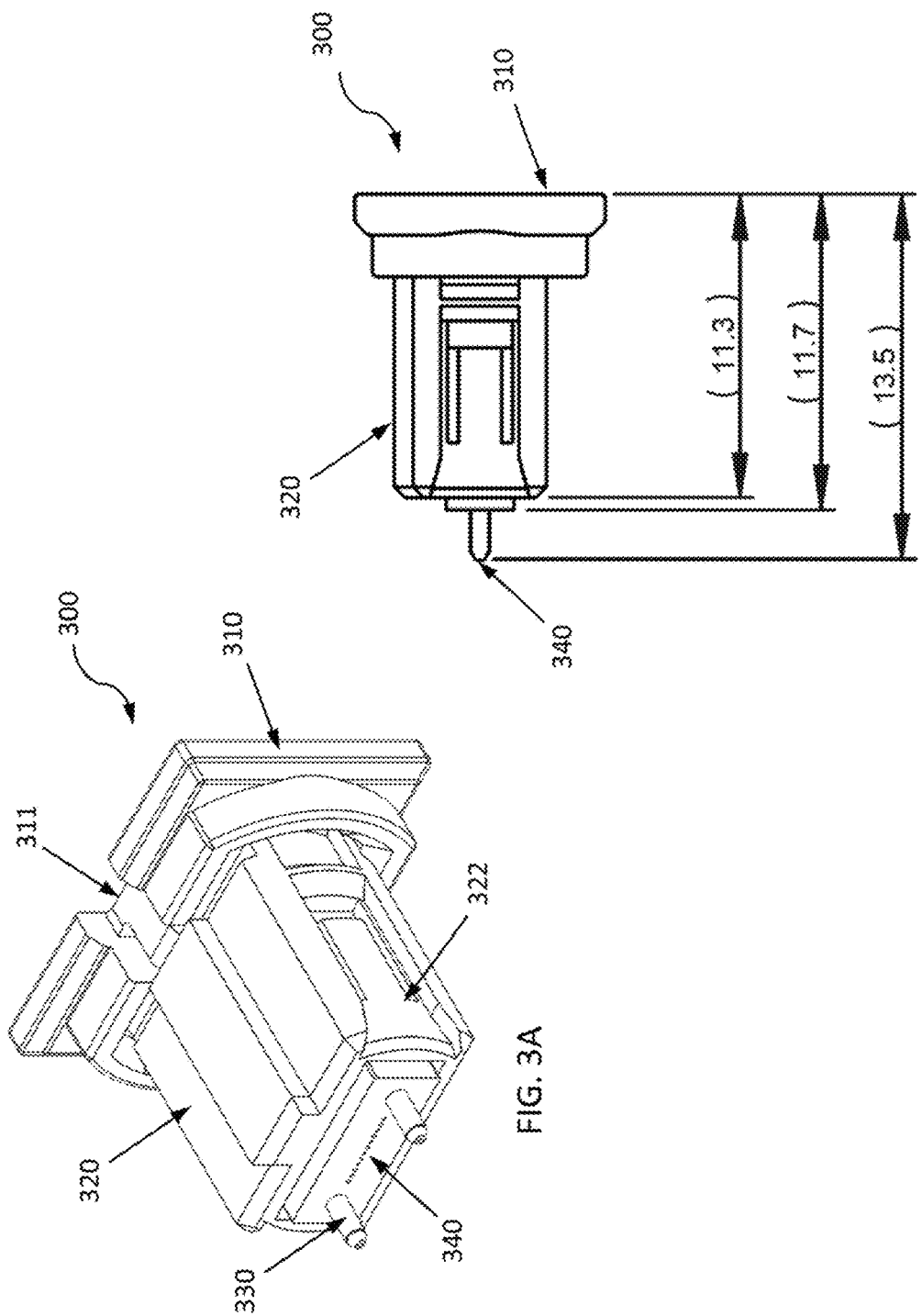

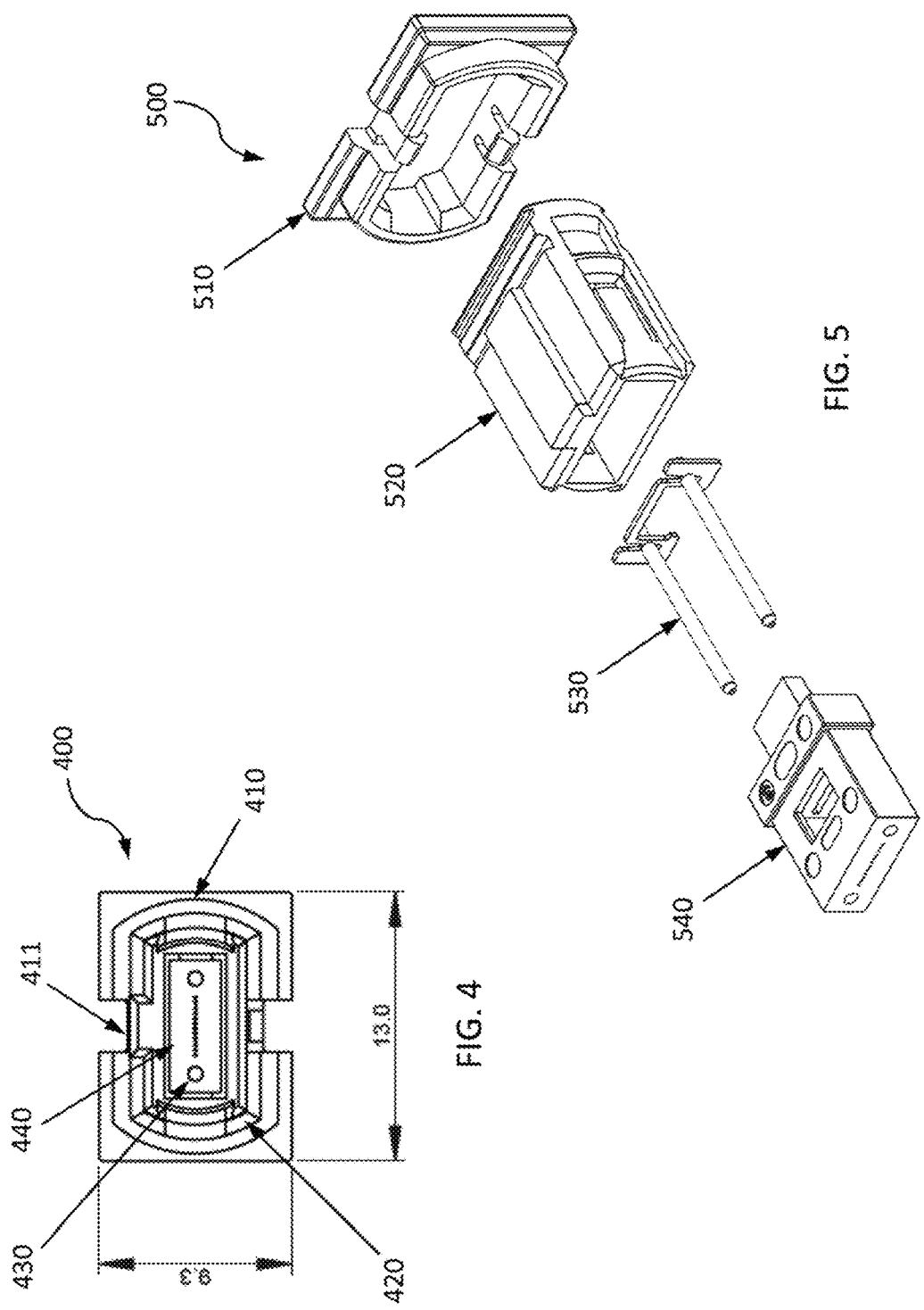

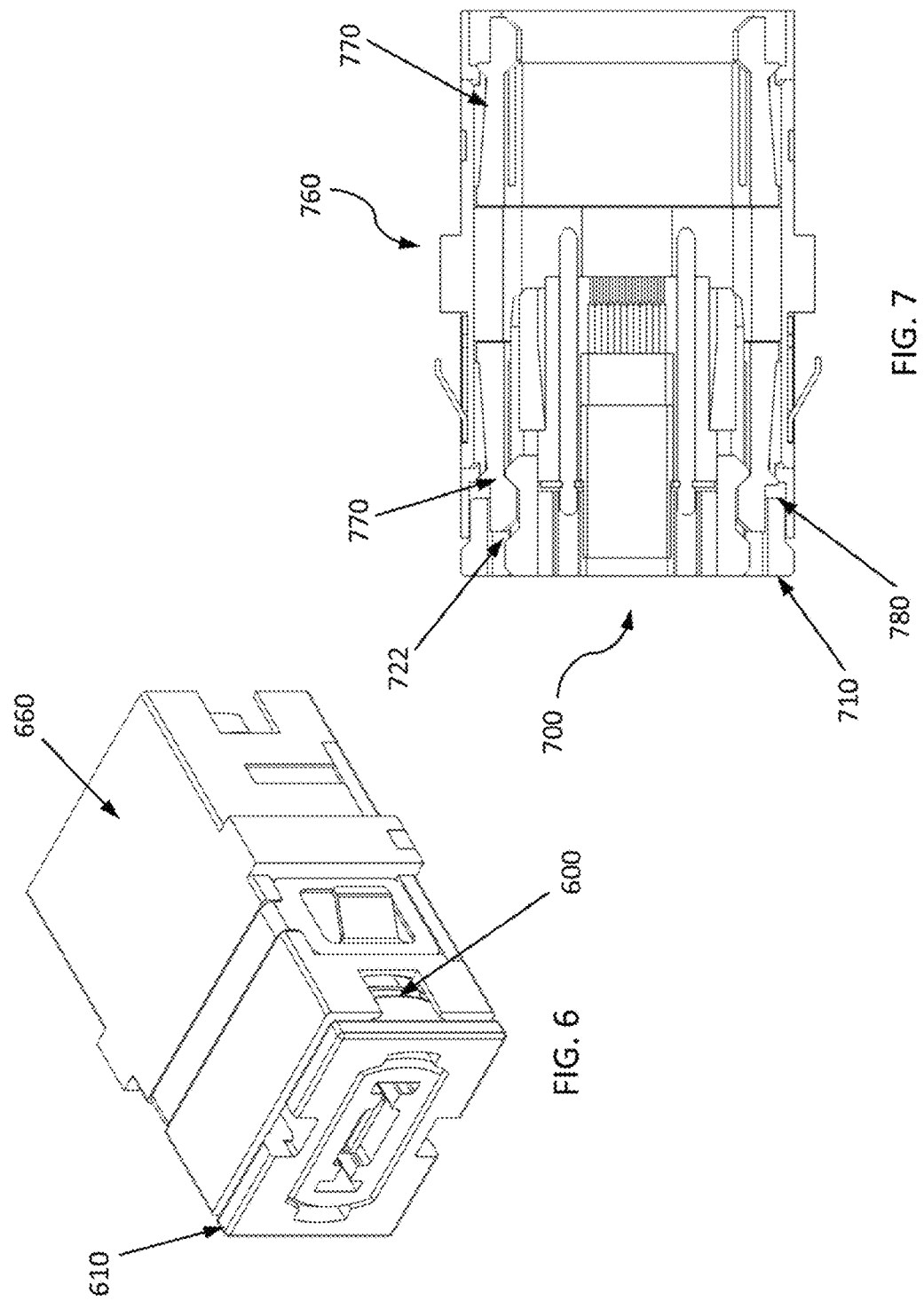

MPO MICRO-LATCHLOCK CONNECTOR

CROSS-REFERENCE TO RELATED APPLICATIONS

This application claims the benefit of U.S. Provisional Application No. 62/504,154, filed May 10, 2017.

BACKGROUND

The present disclosure relates generally to fiber optic connectors, and more specifically to low profile optical-fiber connectors with latchlock connectors.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support data networks in a compacted form factor, thereby increasing quality of service and decreasing costs such as floor space and support overhead. However, the deployment of high-density interconnect panels have not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase support cost and diminish quality of service.

In a high-density panel configuration, adjacent connectors and cable assemblies may be close to one another and thus interfere with access to adjacent connectors. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing quality of service.

Small Form Factor Pluggable Transceivers (SFP) are used presently in telecommunication infrastructures within rack-mounted copper-to-fiber media converters, Ethernet switches, and/or patching hubs. Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will satisfy the form factors for smaller SFPs.

SUMMARY

Embodiments disclosed herein address the aforementioned shortcomings by providing optical fiber connectors that have a relatively low profile including a latchlock connector and locking key. In some embodiments, a connector system may include an adapter.

In summary, the present disclosure provides an optical fiber connector having a flat pin assembly with at least one pin. The optical fiber connector may also have a mechanical transfer ferrule boot disposed around at least a portion of the flat pin assembly and a housing disposed around at least a portion of the mechanical transfer ferrule. The present disclosure provides further details regarding the housing having a first side, a second side, a top side, and a bottom side, wherein each of the first side and the second side includes at least one recess, and the top side includes at least one first groove. Additionally, the optical connector may have a low profile key with one or more first fastening mechanisms each configured to interlock with the at least one first groove.

The present disclosure also provides an optical fiber adapter having a first adapter end configured to receive a first optical fiber connector with one or more first connecting arms, and a second adapter end configured to receive a second optical fiber connector with one or more second connecting arms. In some embodiments, the adapter may couple the second optical fiber connector to the first optical fiber connector.

Further presented herein is a system having both an optical fiber connector and an optical fiber adapter. The optical fiber connector includes a flat pin assembly with at least one pin. The optical fiber connector may also have a mechanical transfer ferrule boot disposed around at least a portion of the flat pin assembly and a housing disposed around at least a portion of the mechanical transfer ferrule. The present disclosure provides further details regarding the housing having a first side, a second side, a top side, and a bottom side, wherein each of the first side and second side includes at least one recess, and the top side includes at least one first groove. Additionally, the optical connector may have a low profile key with one or more first fastening mechanisms each configured to interlock with the at least one first groove. The optical fiber adapter includes a first adapter end configured to receive a first optical fiber connector with one or more first connecting arms, and a second adapter end configured to receive a second optical fiber connector with one or more second connecting arms. In some embodiments, the adapter may couple the second optical fiber connector to the first optical fiber connector.

The foregoing, as well as additional objects, features and advantages of the present disclosure will be more apparent from the following detailed description, which proceeds with reference to the accompanying drawings.

BRIEF DESCRIPTION OF THE DRAWINGS

FIG. 2A is a perspective view of an illustrative multi-fiber push on (MPO) micro-latchlock connector in an unlocked position in accordance with certain embodiments.

FIG. 2B is a side view of an illustrative multi-fiber push on (MPO) micro-latchlock connector in an unlocked position in accordance with certain embodiments.

FIG. 3A is a perspective view of an illustrative multi-fiber push on (MPO) micro-latchlock connector in a locked position in accordance with certain embodiments.

FIG. 3B is a side view of an illustrative multi-fiber push on (MPO) micro-latchlock connector in a locked position in accordance with certain embodiments.

FIG. 4 is a front view of an illustrative multi-fiber push on (MPO) micro-latchlock connector in accordance with certain embodiments.

FIG. 5 is a perspective view of an illustrative exploded multi-fiber push on (MPO) micro-latchlock connector in an unlocked position in accordance with certain embodiments.

FIG. 6 is a perspective view of an illustrative multi-fiber push on (MPO) micro-latchlock connector and a standard adapter in accordance with certain embodiments.

FIG. 7 is a top view of an illustrative multi-fiber push on (MPO) micro-latchlock connector and a standard adapter in accordance with certain embodiments.

DETAILED DESCRIPTION

Figure 1:
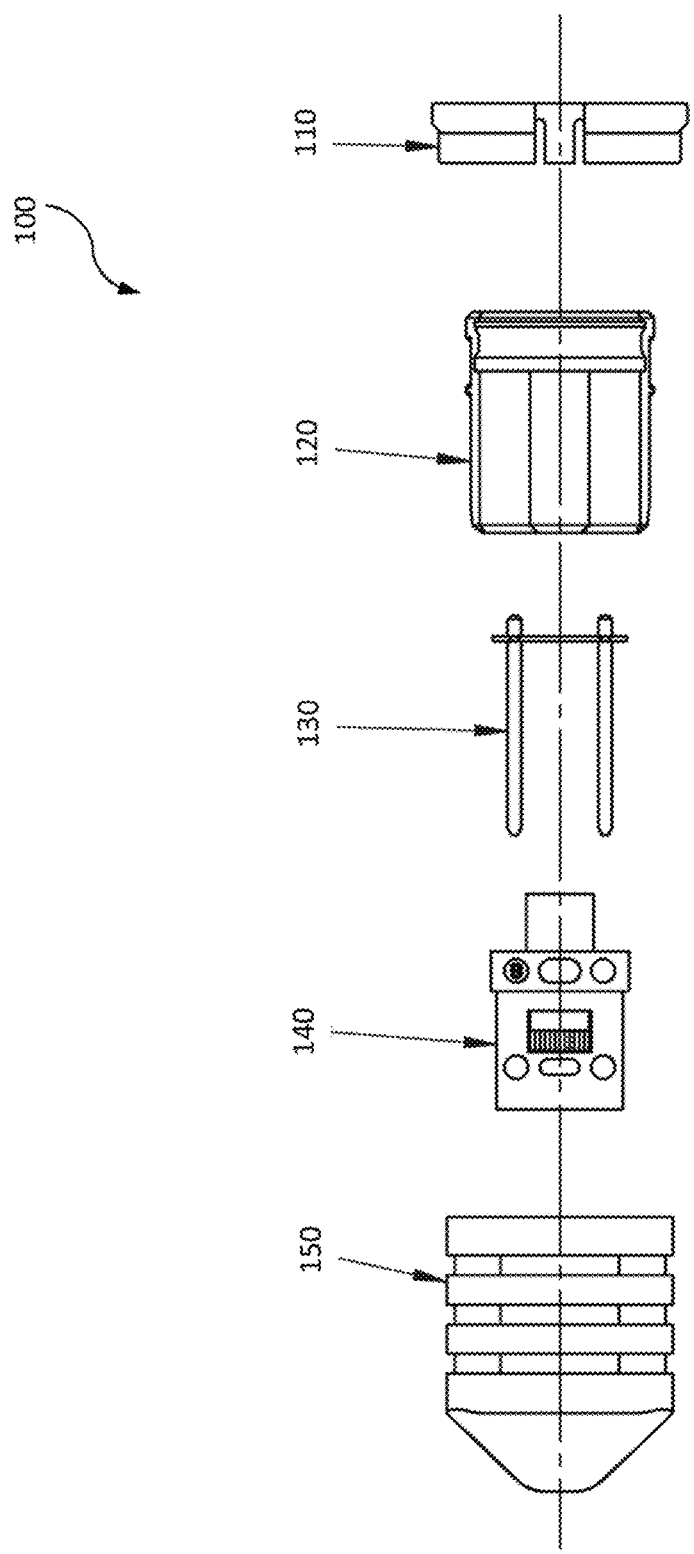
FIG. 1 is an exploded view of an illustrative multi-fiber push on (MPO) micro-latchlock connector in accordance with certain embodiments.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "connector," as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

The terminal ends of a cable may include a connector used to connect the cable with another cable or other fiber optic devices. A connector may include a housing structure configured to interact with and connect with an adapter. An adapter, among other things, may include two aligned ports that align fiber optic connectors and/or electrical connectors therein. The adapter may be used, for example and without limitation, to align and connect optical fibers end-to-end or to allow for pin/socket electrical connections.

Micro-latchlock connectors provide a connection interface for industry standard 0.079" (i.e., 2.00 mm) wire-to-board applications. Generally, a micro-latch system includes female crimp terminals, receptacle housings, and semi-shrouded vertical headers. The connector may include a friction lock mechanism by which the noses on the receptacle housings slide into the header wall openings. This ensures a durable mating and protection of the electrical circuits. As disclosed herein, various embodiments may incorporate a micro-latch (i.e., micro-latchlock) system into a low profile fiber optical connector.

Accordingly, embodiments as disclosed herein may detail a housing that acts as an adapter in order to allow a multi-fiber push on (MPO) micro connector to fit into a standard adapter. In some embodiments, as shown in FIG. 1, the micro-latchlock system 100 may comprise a MPO low profile key 110, a MPO low profile connector housing 120, a MPO flat metal pin assembly 130, a mechanical transfer (MT) ferrule boot 140, and a MPO connector dust cap 150. It should be understood that the depicted micro-latchlock system 100 is a non-limiting example of a micro-latchlock system, and that other systems may include one, all, or some combination of the above-described components of the depicted micro-latchlock system.

Generally, a MPO micro connector may leave a very small protrusion when connected. Thus, when using a MPO micro connector in a standard adaptor connection, the remaining protrusion is very limited. As discussed herein, this can cause issues when interacting with a large array of connectors and adaptors due to the tightly confined area and limited protrusion with which to interact.

Thus, embodiments exist, as shown and described in FIG. 1, where an adapter housing 120 may have a locking mechanism that is approximately 1.5 mm behind the adapter. This locking mechanism may serve to "lock" and/or "unlock" the adapter housing 120 to the MPO micro connector. Thus, embodiments of the design of the locking section may act as a guide in assisting the adapter to the latchlock portion.

FIGS. 2A and 2B depict an embodiment in an "unlocked" state 200. As shown, the housing 220 may contain a groove 221 that spans the width of the housing. In a further embodiment, the MPO low profile key 210 may include one or more first fastening mechanisms 211 configured to interact with the groove 221 and attach the key to the housing 220. In an embodiment, each of a top side and a bottom side of the housing 220 may include a groove 221, and the MPO low profile key 210 may include one or more first fastening mechanisms 211 configured to interact with a groove on a top side of the housing and one or more second fastening mechanisms configured to interact with a groove on a bottom side of the housing (such as is shown in FIG. 2B). The housing 220 may also include one or more recesses 223 and one or more hooks 222 that interlock with the MT ferrule 240. In some embodiments, a first side and a second side of the housing 220 may each include at least one recess 223. The MT ferrule 240 may have an MPO flat pin assembly 230 within it. Accordingly, once the housing 220 is pushed onto the MPO micro connector, the one or more hooks 222 act as a locking mechanism that snaps in place to the connector housing 220. In a further embodiment, the MPO low profile key 210 may serve as a cover and may create an outer housing that prevents the one or more hooks 222 from being opened and releasing the MT ferrule 240.

FIGS. 3A and 3B depict an embodiment in a "locked" state 300. As shown, the housing 320 may contain a groove (not shown) that spans the width of the housing. In a further embodiment, the MPO low profile key 310 may include one or more first fastening mechanisms 311 configured to interact with the groove (not shown) and attach the key to the housing 320. In an embodiment, each of a top side and a bottom side of the housing 320 may include a groove (not shown), and the MPO low profile key 310 may include one or more first fastening mechanisms 311 configured to interact with a groove on a top side of the housing and one or more second fastening mechanisms configured to interact with a groove on a bottom side of the housing. The housing 320 may also include one or more hooks 322 that interlock with the MT ferrule 340, wherein the MT ferrule may have an MPO flat pin assembly 330 within it. Accordingly, once the housing 320 is pushed onto the MPO micro connector, the one or more hooks 322 act as a locking mechanism that snaps in place to the connector housing. In a further embodiment, the MPO low profile key 310 may serve as a cover and may create an outer housing that prevents the one or more hooks 322 from being opened and releasing the MT ferrule 340.

FIG. 4 show a front view of micro-latchlock system 400 to show further detail of the housing 420 that may contain a recess (not shown) that spans the width of the housing. In a further embodiment, the MPO low profile key 410 may include one or more first fastening mechanisms 411 configured to interact with the groove (not shown) and attach the key to the housing 420. The housing 420 may also include one or more hooks (not shown) that interlock with the MT ferrule 440. The MT ferrule may have an MPO flat pin assembly within it 430. Accordingly, once the housing 420 is pushed onto the MPO micro connector, the one or more hooks (not shown) act as a locking mechanism that snaps in place to the connector housing. In a further embodiment, the MPO low profile key 410 may serve as a cover and may create an outer housing that prevents the one or more hooks (not shown) from being opened and releasing the MT ferrule 440.

Accordingly, as shown in FIG. 5, embodiments as disclosed herein relate to a MPO micro-latchlock connector system 500. As discussed herein, the system enables a micro connector to be used in a standard adapter while also containing a latchlock interface. Some embodiments, as disclosed herein may include a MPO low profile key 510, a MPO low profile connector housing 520, a MPO flat metal pin assembly 530, and a mechanical transfer (MT) ferrule boot 540. It should be understood that the depicted micro-latchlock system 500 is a non-limiting example of a micro-latchlock system, and that other systems may include one, all, or some combination of the above-described components of the depicted micro-latchlock system.

FIG. 6 shows an additional illustrative view of some embodiments. Specifically, FIG. 6 shows a perspective view of the MPO micro-latchlock connector 600 as it would interact with an adapter 660. As discussed herein, the micro-latchlock connector 600 may have a MPO low profile key 610.

Referring now to FIG. 7, a top sectional view of an embodiment is shown where an MPO micro-latchlock connector 700 interacts with an adapter 760. In some embodiments, the adapter 760 may have one or more connecting arms 770. The one or more connecting arms 770 may be constructed of a flexible material and may be angled slightly toward the center of the adapter, as shown. In further embodiments, when the connector 700 is inserted into the adapter 760, the one or more connecting arms 770 may interact with one or more recesses 722 on the sides of the connector. This may allow the connector 700 to be positioned in a particular static location within the adaptor 760 to ensure proper connection with a secondary connector. In some embodiments, and as discussed herein, the micro-latchlock connector 700 may have a MPO low profile key 710. The MPO low profile key 710, as shown, may slide into a recess 780 on the adapter 760. The MPO low profile key 710, may have one or more protrusions that prohibit the one or more connecting arms 770 from removing themselves from the one or more recesses 780. Thus, in some embodiments, the MPO low profile key 710, may ensure that the connector 700 and the adapter 760 are securely connected and fastened together.

In some embodiments, the adapter 760 may be able to connect to connectors, such as 700, on each of a first end and a second end. Each of the first end and the second end may have similar components as those shown in FIG. 7.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber connector comprising:
   a flat pin assembly having at least one pin;
   a mechanical transfer ferrule boot disposed around at least a portion of the flat pin assembly;
   a housing disposed around at least a portion of the mechanical transfer ferrule, the housing comprising a first side, a second side, a top side, and a bottom side, wherein each of the first side and the second side comprises at least one recess, and wherein the top side comprises at least one first groove; and
   a low profile key comprising one or more first fastening mechanisms each configured to interlock with the at least one first groove.

2. The connector of claim 1, wherein the housing further comprises a bottom side comprising at least one second groove; and
   wherein the low profile key comprises a second fastening mechanism configured to interlock with the at least one second groove.

3. The connector of claim 1, wherein the mechanical transfer ferrule boot comprises a wired friction lock connection.

4. The connector of claim 1, wherein the at least one first groove traverses at least one of a portion of the top side of the housing and an entirety of the top side of the housing.

5. The connector of claim 1, wherein the one or more first fastening mechanisms traverse at least one of a portion of the top side of the low profile key and an entirety of the top side of the low profile key.

6. The connector of claim 1, further comprising a dust cap removably attached to and disposed around the housing.

7. A system comprising:
   an optical fiber connector comprising:
      a flat pin assembly having at least one pin,
      a mechanical transfer ferrule boot disposed around at least a portion of the flat pin assembly,
      a housing disposed around at least a portion of the mechanical transfer ferrule, the housing comprising a first side, a second side, a top side, and a bottom side, wherein each of the first side and the second side comprises at least one recess, and wherein the top side comprises at least one first groove, and
      a low profile key comprising one or more first fastening mechanisms, the first fastening mechanisms configured to interlock with the at least one first groove; and
   an optical fiber adapter comprising:

a first adapter end configured to receive a first optical fiber connector, the first adapter end comprising one or more first connecting arms, and a second adapter end configured to receive a second optical fiber connector and couple the second optical fiber connector to the first optical fiber connector, the second adapter end comprising one or more second connecting arms.

8. The system of claim 7, wherein the housing further comprises a bottom side comprising at least one second groove; and wherein the low profile key comprises a second fastening mechanism, the second fastening mechanism configured to interlock with the at least one second groove.

9. The system of claim 7, wherein the mechanical transfer ferrule boot comprises a wired friction lock connection.

10. The system of claim 7, wherein the at least one first groove traverses at least one of a portion of the top side of the housing and an entirety of the top side of the housing.

11. The system of claim 7, wherein the one or more first fastening mechanisms traverse at least one of a portion of the top side of the low profile key and an entirety of the top side of the low profile key.

12. The system of claim 7, wherein each of the one or more first connecting arms and the one or more second connecting arms are constructed of a flexible material; and wherein each of the one or more first connecting arms and the one or more second connecting arms are angled toward a center line of the optical fiber adapter.

13. The system of claim 7, wherein the one or more first connecting arms interlock with the at least one recess on the first side; and wherein the one or more second connecting arms interlock with the at least one recess on the second side.

14. The system of claim 13, wherein the low profile key is configured to restrict movement of the one or more first connecting arms and the one or more second connecting arms.

15. The system of claim 7, wherein the low profile key extends a distance between about 0.01 millimeters and about 0.5 millimeters from at least one of the first adapter end and the second adapter end.

16. The system of claim 7, wherein the low profile key is flush with at least one of the first adapter end and the second adapter end.

* * * * *